United States Patent [19]
Hoffmann et al.

[11] 3,996,168
[45] Dec. 7, 1976

[54] CERAMIC ELECTRICAL RESISTOR

[75] Inventors: Günther Hoffmann, Munich; Helmut Schmelz, Prien, both of Germany

[73] Assignee: Siemens Aktiengesellschaft, Berlin & Munich, Germany

[22] Filed: Feb. 4, 1974

[21] Appl. No.: 439,569

[30] Foreign Application Priority Data

Feb. 19, 1973 Germany .......................... 2308073

[52] U.S. Cl. .............................. 252/520; 252/518; 252/519; 252/521
[51] Int. Cl.² .......................................... H01B 1/06
[58] Field of Search .......... 252/513, 512, 520, 521, 252/519, 518

[56] References Cited

UNITED STATES PATENTS

| | | | |
|---|---|---|---|
| 3,732,117 | 5/1973 | Nitta et al. | 252/520 |
| 3,754,987 | 8/1973 | Purdes | 252/519 |

*Primary Examiner*—Stephen J. Lechert, Jr.
*Attorney, Agent, or Firm*—Hill, Gross, Simpson, Van Santen, Steadman, Chiara & Simpson

[57] ABSTRACT

Ceramic electrical resistors having a positive temperature-resistance coefficient, consisting of barium titanate with an atomic excess of titanium, and having a ferroelectric perowskite structure, the resistor being conductive by the presence therein of a rare earth dopant, the resistor also containing one or more of the following elements: cobalt, chromium, nickel, vanadium, manganese and copper. The resistor composition also desirably containing significant amounts of silicon.

21 Claims, 1 Drawing Figure

U.S. Patent     Dec. 7, 1976     3,996,168
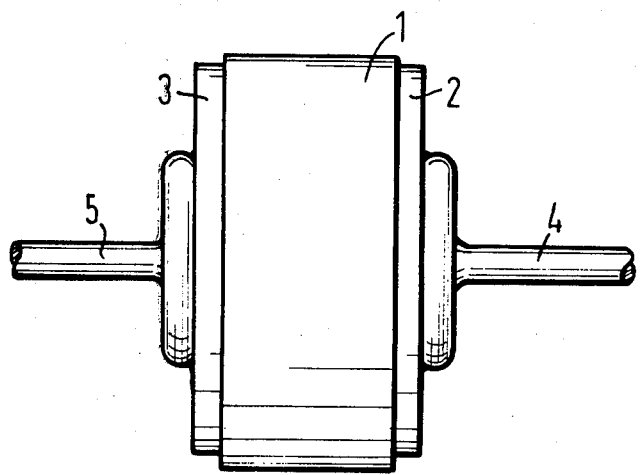

CERAMIC ELECTRICAL RESISTOR

BACKGROUND OF THE INVENTION

1. Field of the Invention

This invention is in the field of ceramic electrical resistors based upon barium titanate and containing small amounts of one or more of the metals cobalt, chromium, nickel, vanadium, manganese and copper. The resistors of the present invention have low specific resistances below their Curie temperatures and, above their Curie temperatures, exhibit a rise in resistance of more than 4 and sometimes 5 powers of 10. Such resistors have a very steep resistance-temperature characteristic and evidence only a slight varistor effect.

2. DESCRIPTION OF THE PRIOR ART

In German Pat. No. 929,350 there is described a ceramic resistor with a positive temperature coefficient, based upon barium titanate, with an excess of titanium dioxide as well as an additive of silica. These materials were rendered semiconducting by doping them with metals such as bismuth, antimony or tungsten or rare earth such as yttrium, lanthanum, gadolinium or erbium. These resistors, above their Curie temperatures, exhibited an increase in resistance by a factor of 100 to 1,000.

In German patent application PS No. 1,471,445 there is described electrical resistors having a positive resistance temperature coefficient and a low dependence of resistance upon applied voltage. The resistors described in this application are based upon perowskite structures which have been doped by means of antimony, niobium or lanthanum. The rise in resistance above the Curie temperature is achieved by a specific distribution of trivalent and pentavalent antimony ions between the grain interior and the grain boundaries. Such a distribution is difficult to achieve as a practical process. Also, these resistors are moisture sensitive so that when used under normal operating conditions they have to be incorporated into moisture tight housings.

In German application AS No. 1,941,280 there is described a ceramic semiconductor with a resistance having a positive temperature coefficient based upon a material of perowskite structure with a silica additive and containing a manganese dopant, together with a rare earth, bismuth or antimony. This resistor, above its Curie temperature, exhibits a resistance increase of more than 4 powers of 10. This resistor has a weak varistor effect, that is, its resistance is not substantially dependent upon the applied voltage, although its resistance-temperature characteristic can be influenced by atmospheric effects.

In German application OS No. 1,465,109 there is described a resistor having a positive resistance temperature coefficient consisting of a material of perowskite structure based upon barium titanate or barium-strontium titanate or barium-lead-titanate, and having a titanium surplus and a small amount of tin oxide. The doping substances used to create the conductivity may be materials such as praseodymium, neodymium or samarium, or a mixture of the rare earths cerium, lanthanum, neodymium, praseodymium, samarium, gadolinium or yttrium. This resistor, above its Curie temperature, exhibits a rise in resistance of about 3 powers of 10.

In German applications OS No. 1,646,987 and OS No. 1,646,988 there are described electrical resistors having a positive resistance temperature coefficient and consisting of doped ferroelectric material of perowskite structure having the formula $Me^{II} Me^{IV}O_3$ with a surplus of $Me^{IV}$ metals. The doping substances used in order to produce conductivity in this type of resistor may be antimony, niobium or lanthanum. The resistors may also contain copper or iron. The rise in resistance above the Curie temperature, in these resistors, is about 4 powers of 10.

SUMMARY OF THE INVENTION

The ceramic electrical resistor of the present invention has a low specific resistance below its Curie temperature and, above its Curie temperature, exhibits a rise in resistance of at least 4 and usually about 5 powers of 10. It has a very steep-resistance temperature characteristic which, upon the application of a voltage providing a field strength of 10 volts per millimeter exhibits a resistance increase of better than 4 powers of 10, that is, it has a slight varistor effect. The resistance-temperature characteristic of the new resistors is substantially independent of atmospheric influences. Furthermore, it is possible to utilize raw materials of low purity in making the resistors of the present invention thereby leading to less expensive manufacture.

The ceramic electrical resistor of the present invention is based upon barium titanate having a slight atomic excess of titanium, having a perowskite structure, and containing a rare earth dopant such as lanthanum, cerium, gadolinium, or neodymium in an amount of from 0.4 to 1.2 atomic percent. The resistors also contain one or more of the following elements in the indicated quantities: cobalt from 0.1 to 0.5 atomic percent; chromium from 0.005 to 0.2 atomic percent; nickel in an amount of about 0.1 atomic percent; vanadium in an amount of about 0.04 atomic percent; manganese from 0.08 to 0.12 atomic percent; and copper from 0.005 to 0.020 atomic percent. Preferably, the compositions also contain between 0.5 and 2 atomic percent of silicon.

DESCRIPTION OF THE PREFERRED EMBODIMENTS

The single FIGURE in the drawing illustrates a cold conductor consisting of a ceramic electrical resistance member 1 produced according to the present invention provided with barrier layer-free contact coatings 2 and 3, and connecting wires 4 and 5 applied thereto.

Further advantages of the ceramic resistors of the present invention will be apparent from the following specific disclosure of a method for making the same and a description of their properties.

EXAMPLE

In the manufacture of a ceramic electrical resistor in accordance with the present invention, the raw materials present in the form of oxides or salts, are ground for 20 hours in distilled water in a ball mill and, after drying, reacted for two hours at temperatures between 1,000° and 1,200° C. Then, a second grinding is carried out in distilled water, lasting between 20 and 100 hours. After drying, the material is mixed with a binder and given the desired shape by a pressing operation, whereafter it is sintered for between ten and three hundred minutes in an oxidizing atmosphere at temperatures between 1,300° and 1,400° C. Finally, the resultant resistor is provided with a non-blocking contact.

In the following table, the electrical properties of the ceramic resistors, as well as their compositions, have been described. The specific electrical resistance at 25° C as well as the overall resistance rises $A_1$ and $A_{10}$ have been indicated. $A_1$ is the ratio of maximum resistance $R_{max}$ at an applied field strength of 1 V/mm to the minimum resistance $R_{min}$ at a field strength of 1 V/mm. $A_{10}$ is the measure of the voltage dependence, namely, the varistor effect and is the ratio between $R_{max}$ at 10 V/mm to $R_{min}$ at 1 V/mm.

tains neodymium as the dopant. The concentration of the doping substance and the other additives, with the exception of the copper additive, can be related to each other according to the following approximation:

[Nd] in atomic % $\approx a + b \cdot$ [Co] in atomic % + $b_2 \cdot$ [Cr] in atomic % + $b_3 \cdot$ [Ni] in atomic % + $b_4 \cdot$ [V] in atomic % + $b_5$ [Mo] in atomic % where
$a \approx 0.2$

| Sample No. | Composition in Atom % | | | | | | | | | | | | |
|---|---|---|---|---|---|---|---|---|---|---|---|---|---|
| | Ba | Ti | La | Ce | Gd | Nd | Co | Cr | Ni | V | Mn | Cu | Si |
| 1 | 100 | 103 | — | — | — | 0.4 | 0.1 | — | — | — | — | — | — |
| 2 | 100 | 103 | — | — | — | 0.6 | 0.2 | — | — | — | — | — | — |
| 3 | 100 | 103 | — | — | — | 0.8 | 0.3 | — | — | — | — | — | — |
| 4 | 100 | 103 | — | — | — | 0.8 | 0.3 | — | — | — | — | — | 2.0 |
| 5 | 100 | 103 | — | — | — | 1.2 | 0.5 | — | — | — | — | — | 2.0 |
| 6 | 100 | 103 | — | — | — | 0.6 | 0.16 | — | — | 0.04 | — | — | 2.0 |
| 7 | 100 | 103 | — | — | — | 0.6 | 0.2 | — | — | — | — | 0.005 | 0.5 |
| 8 | 100 | 103 | — | — | — | 0.6 | 0.2 | — | — | — | — | 0.01 | 2.0 |
| 9 | 100 | 103 | — | — | — | 0.8 | 0.3 | — | — | — | — | 0.015 | — |
| 10 | 100 | 103 | — | — | — | 0.6 | 0.12 | — | — | — | 0.08 | — | 2.0 |
| 11 | 100 | 103 | — | — | — | 0.6 | 0.10 | — | — | — | 0.10 | — | 2.0 |
| 12 | 100 | 103 | — | — | — | 0.6 | 0.08 | — | — | — | 0.12 | 0.005 | 2.0 |
| 13 | 100 | 103 | — | — | — | 0.6 | 0.195 | 0.005 | — | — | — | — | 2.0 |
| 14 | 100 | 103 | — | — | — | 0.6 | 0.16 | 0.04 | — | — | — | — | 2.0 |
| 15 | 100 | 103 | — | — | — | 0.5 | — | 0.2 | — | — | — | — | — |
| 16 | 100 | 103 | — | — | — | 0.6 | 0.2 | — | — | — | — | 0.02 | 2.0 |
| 17 | 100 | 103 | — | — | — | 0.6 | 0.2 | — | — | — | — | — | 2.0 |
| 18 | 100 | 103 | — | — | — | 0.6 | — | 0.2 | — | — | — | — | — |
| 19 | 100 | 103 | — | — | — | 0.4 | — | — | 0.1 | — | — | — | 2.0 |
| 20 | 100 | 103 | 0.8 | — | — | — | 0.3 | — | — | — | — | — | 2.0 |
| 21 | 100 | 103 | — | 0.5 | — | — | 0.15 | — | — | — | — | — | 2.0 |
| 22 | 100 | 103 | — | — | 0.6 | — | 0.2 | — | — | — | — | — | 2.0 |

| | Electrical parameters | | |
|---|---|---|---|
| Sample No. | Specific Resistance ohm-cm | $A_1$ | $A_{10}$ |
| 1 | 40 | $6.0 \times 10^4$ | $2.2 \times 10^4$ |
| 2 | 60 | $9.0 \times 10^4$ | $3.6 \times 10^4$ |
| 3 | 45 | $1.0 \times 10^5$ | $2.5 \times 10^4$ |
| 4 | 18 | $3.5 \times 10^4$ | $2.1 \times 10^4$ |
| 5 | 30 | $4.5 \times 10^4$ | $3.5 \times 10^4$ |
| 6 | 30 | $7.0 \times 10^4$ | $3.8 \times 10^4$ |
| 7 | 100 | $2.0 \times 10^5$ | $1.3 \times 10^5$ |
| 8 | 90 | $2.2 \times 10^5$ | $1.3 \times 10^5$ |
| 9 | 180 | $6.0 \times 10^4$ | $3.0 \times 10^4$ |
| 10 | 115 | $2.8 \times 10^5$ | $2.0 \times 10^5$ |
| 11 | 85 | $3.7 \times 10^5$ | $2.0 \times 10^5$ |
| 12 | 300 | $2.7 \times 10^5$ | $1.9 \times 10^5$ |
| 13 | 74 | $2.4 \times 10^4$ | $2.0 \times 10^4$ |
| 14 | 37 | $9.1 \times 10^4$ | $4.3 \times 10^4$ |
| 15 | 100 | $1.2 \times 10^5$ | $4.2 \times 10^4$ |
| 16 | 70 | $4.0 \times 10^4$ | $3.4 \times 10^4$ |
| 17 | 35 | $3.5 \times 10^4$ | $2.1 \times 10^4$ |
| 18 | 80 | $5.0 \times 10^4$ | $1.0 \times 10^4$ |
| 19 | 150 | $5.5 \times 10^4$ | $0.9 \times 10^4$ |
| 20 | 70 | $2.0 \times 10^4$ | $1.4 \times 10^4$ |
| 21 | 50 | $2.5 \times 10^4$ | $2.0 \times 10^4$ |
| 22 | 15 | $2.0 \times 10^4$ | $0.8 \times 10^4$ |

This table illustrates the improved electrical properties of the ceramic resistors of the present invention. These materials have a low specific resistance below the Curie temperature but above the Curie temperature have a high total resistance rise of more than 4 powers of 10. Consequently, they are particularly suitable for engineering applications where the greatest possible overall temperature rise is required as, for example, in perforated mask demagnetization applications in color television receivers. It is also evident from the foregoing table that the ceramic resistors of the present invention exhibit only a weak varistor effect.

In accordance with a preferred embodiment of the present invention, the ceramic electrical resistor con- $b_1 \approx 2$
$b_2 \approx 2$
$b_3 \approx 2$
$b_4 \approx 2$
$b_5 \approx 2-3$ the additives being so correlated that a neodymium concentration of between 0.4 and 1.2 atomic percent results.

Another advantage of the resistors of the present invention resides in the fact that due to the relatively larger quantities of additives, they are less sensitive to raw material impurities in the basic substances used to manufacture the barium titanate which possesses the perowskite structure. This advantage makes for significantly cheaper manufacture of ceramic electrical resistors because a considerable part of the cost of the finished resistor is due to the barium titanate.

A further advantage of the ceramic resistor of the present invention is that its resistance-temperature characteristic is not dependent upon atmospheric influences. This means that the electrical resistors having a positive temperature coefficient and manufactured in accordance with the present invention need not be installed in a housing, thereby further reducing the manufacturing costs.

To test the susceptibility to atmospheric influences, ceramic electrical resistors of the compositions specified in samples numbers 2 and 8 in the table were subjected to a moisture duration test at 95% relative atmospheric humidity, at a temperature of 85° C, for one month. The test specimens after this time exhibited no changes whatsoever in their electrical properties.

It will be seen that the ceramic electrical resistors of the present invention are distinguished by a low specific resistance below the Curie temperature, by a high resistance rise above the Curie temperature, by a weak varistor effect and by non-sensitivity to atmospheric influences. Furthermore, their manufacturing costs are significantly lower than those of other known ceramic resistors.

We claim as our invention:

1. A ceramic electrical resistor having a positive temperature-resistance coefficient and comprising barium titanate having an atomic excess of titanium, said resistor having a ferroelectric perowskite structure, said resistor being conductive by the presence therein of a rare earth dopant in an amount of from 0.4 to 1.2 atomic percent, said resistor also containing at least one of the following elements in the amounts indicated: cobalt from 0.1 to 0.5 atomic percent, chromium from 0.005 to 0.2 atomic percent, nickel in an amount of about 0.1 atomic percent, vanadium in an amount of about 0.04 atomic percent, manganese from 0.08 to 0.12 atomic percent and copper from 0.005 to 0.020 atomic percent, said resistor having a specific electrical resistance at 25° C of about 15 to 300 ohm-cm.

2. The resistor of claim 1 in which said dopant includes lanthanum.

3. The resistor of claim 2 which additionally contains between 0.5 and 2 atomic percent of silicon.

4. The resistor of claim 1 in which said dopant includes cerium.

5. The resistor of claim 4 which additionally contains between 0.5 and 2 atomic percent of silicon.

6. A ceramic electrical resistor of claim 1 in which the dopant includes gadolinium.

7. The resistor of claim 6 which additionally contains 0.5 to 2 atomic percent of silicon.

8. The resistor of claim 1 in which said dopant includes neodymium.

9. A resistor as claimed in claim 3, containing 0.8 atomic percent of lanthanum, 0.3 atomic percent of cobalt and 2 atomic percent of silicon.

10. A resistor as claimed in claim 5, containing 0.5 atomic percent cerium, 0.15 atomic percent cobalt and 2 atomic percent silicon.

11. An electrical resistor as claimed in claim 7 containing 0.6 atomic percent gadolinium, 0.2 atomic percent of cobalt and 2 atomic percent of silicon.

12. A ceramic electrical resistor having a positive temperature-resistance coefficient and comprising barium titanate having a ferroelectric perowskite structure, said resistor being conductive by the presence of neodymium therein, said resistor also containing cobalt, chromium, nickel, vanadium, and molybdenum according to the following relationship:

[Nd] in atomic percent equals approximately $a + b \cdot [Co]$ in atomic percent $+ b_2 \cdot [Cr]$ in atomic percent $+ b_3 \cdot [Ni]$ in atomic percent, $+ b_4 \cdot [V]$ in atomic percent $+ b_5 \cdot [Mo]$ in atomic percent where $a$ is about 0.2
$b_1$ is about 2
$b_2$ is about 2
$b_3$ is about 2
$b_4$ is about 2 and
$b_5$ is about 2 to 3 the additives being so correlated that a neodymium concentration of between 0.4 and 1.2 atomic percent results, said resistor also containing between 0.005 and 0.02 atomic percent copper, said resistor having a specific electrical resistance at 25° C of about 15 to 300 ohm-cm.

13. The resistor of claim 12 which also contains between 0.5 and 2 atomic percent of silicon.

14. The resistor of claim 12 which contains 0.6 atomic percent neodymium and 0.2 atomic percent cobalt.

15. The resistor of claim 12 which contains 0.8 atomic percent neodymium and 0.3 atomic percent cobalt.

16. The resistor of claim 12 which contains 0.5 atomic percent neodymium and 0.2 atomic percent chromium.

17. The resistor of claim 13 which contains 0.6 atomic percent neodymium, 0.2 atomic percent cobalt, 0.01 atomic percent copper and 2 atomic percent silicon.

18. The resistor of claim 13 which contains 0.6 atomic percent neodymium, 0.1 atomic percent cobalt, 0.1 atomic percent manganese, and 2 atomic percent silicon.

19. The resistor of claim 13 which contains 0.6 atomic percent neodymium, 0.12 atomic percent cobalt, 0.08 atomic percent manganese, and 2 atomic percent silicon.

20. The resistor of claim 13 which contains 0.6 atomic percent neodymium, 0.2 atomic percent cobalt, 0.005 atomic percent copper and 0.5 atomic percent silicon.

21. The resistor of claim 13 which contains 0.6 atomic percent neodymium, 0.08 atomic percent cobalt, 0.12 atomic percent manganese, 0.005 atomic percent copper and 2 atomic percent silicon.

* * * * *